US011822213B1

(12) United States Patent
Duan et al.

(10) Patent No.: US 11,822,213 B1
(45) Date of Patent: Nov. 21, 2023

(54) SOFTBOX AND SUBSTRATE THEREOF

(71) Applicant: ZHONGSHAN DASHAN PHOTOGRAPHIC EQUIPMENT CO., LTD., Guangdong (CN)

(72) Inventors: Jinhua Duan, Guangdong (CN); Xihua Zhu, Guangdong (CN)

( * ) Notice: Subject to any disclaimer, the term of this patent is extended or adjusted under 35 U.S.C. 154(b) by 0 days.

(21) Appl. No.: 17/994,377

(22) Filed: Nov. 27, 2022

(30) Foreign Application Priority Data

Sep. 26, 2022 (CN) .......................... 202211174217.5

(51) Int. Cl.
*G03B 15/06* (2021.01)
(52) U.S. Cl.
CPC .................... *G03B 15/06* (2013.01)
(58) Field of Classification Search
CPC ....................................................... G03B 15/06
See application file for complete search history.

(56) References Cited

U.S. PATENT DOCUMENTS

| | | | | |
|---|---|---|---|---|
| 2005/0225989 | A1* | 10/2005 | Harlocker | G03B 15/06 362/341 |
| 2019/0377242 | A1* | 12/2019 | Boerup | G03B 15/06 |
| 2021/0141288 | A1* | 5/2021 | Karle | G03B 15/06 |
| 2021/0382374 | A1* | 12/2021 | Yoo | G03B 15/02 |
| 2022/0290846 | A1* | 9/2022 | Que | F21V 17/06 |

FOREIGN PATENT DOCUMENTS

| | | | |
|---|---|---|---|
| KR | 20200134916 A | * 12/2020 | |
| WO | WO-2020151436 A1 | * 7/2020 | |
| WO | WO-2021212872 A1 | * 10/2021 | ............. F16M 13/02 |
| WO | WO-2022151573 A1 | * 7/2022 | |

OTHER PUBLICATIONS

English translation of Go KR-20200134916-A published May 2019 (Year: 2019).*
English translation of Shen WO-2020151436-A1 published Jul. 2020 (Year: 2020).*
English translation of Shen WO-2022151573-A1 published Jul. 2022 (Year: 2022).*
English translation of Zeng WO-2021212872-A1 published Oct. 2021 (Year: 2021).*

* cited by examiner

*Primary Examiner* — Evan P Dzierzynski

(57) ABSTRACT

A substrate of a softbox includes a chuck with a plurality of clamping slots; a plurality of connecting members corresponding to clamping slots, respectively, each connecting member including opposite first and second ends, the first end being rotatably connected into a corresponding clamping slot; and a plurality of position limit assemblies being movably mounted in the clamping slots, respectively, each position limit assembly including an abutting portion. The connecting member may rotate to a first position to make the first end abut against the abutting portion. The position limit assembly may be moved to release the first end, making the connecting member be capable of rotating to a second position. When there is no external force applied to the position limit assembly and the connecting member at the second position is rotated, the connecting member may press the abutting portion and return back to the first position.

20 Claims, 8 Drawing Sheets

SOFTBOX AND SUBSTRATE THEREOF

CROSS-REFERENCE TO RELATED APPLICATIONS

The present application claims priority of Chinese Patent Application No. 202211174217.5, filed on Sep. 26, 2022, the entire contents of which are hereby incorporated by reference.

TECHNICAL FIELD

The present application relates to the technical field of softboxes, and in particular to a softbox and a substrate thereof.

BACKGROUND

Softbox is an accessory of photographic equipment, which is used together with the strobe flash to make the emitted light softer and eliminate the light spots and light shadows on the photograph taken. The softbox is generally consisted of a soft cloth, a plurality of support bars, a substrate, and etc. The plurality of support bars are connected to a periphery of the substrate, and the soft cloth is attached onto the support bars. The support bars are designed to be foldable and unfoldable, so as to support the soft cloth and reflective cloth in the unfolded state and to be folded for storage and carrying when it is not in use. The existing softbox is complex in structure, and is extremely inconvenient to unfold and fold when it is in use.

SUMMARY

An object of the present invention is to provide a softbox and a substrate thereof which are simple in structure and convenient in operation.

In one aspect, the present invention provides a substrate of a softbox, which includes a chuck with a plurality of clamping slots defined along the circumferential direction and spaced from each other; a plurality of connecting members corresponding to the plurality of clamping slots, respectively, each connecting member including opposite first and second ends, the first end being rotatably connected into a corresponding clamping slot; and a plurality of position limit assemblies being movably mounted in the clamping slots, respectively, each position limit assembly including an abutting portion. The connecting member is capable of rotating relative to the chuck to a first position to make the first end of the connecting member abut against the abutting portion, thereby locking the connecting member. The position limit assembly is capable of being moved to release the abutment of the abutting portion against the first end, making the connecting member be capable of rotating relative to the chuck to a second position. When there is no external force applied to the position limit assembly and the connecting member at the second position is rotated, the connecting member is capable of pressing the abutting portion of the position limit assembly and returning back to the first position.

In some embodiments, the first end of the connecting member is provided with a first abutting surface, the abutting portion of the position limit assembly is provided with a second abutting surface, and the first abutting surface abuts against the second abutting surface when the connecting member at the first position.

In some embodiments, the chuck is annular and includes opposite first and second end surfaces, the clamping slot extends through a periphery of the chuck, the second end surface, and a joint portion between the periphery and second end surface of the chuck, the second end of the connecting member protrudes out from the periphery of the chuck when the connecting member at the first position, and the second end of the connecting member protrudes out from the second end surface of the chuck when the connecting member at the second position.

In some embodiments, the first abutting surface and second abutting surface both are inclined surfaces and incline toward the center of the chuck along a direction that the second end surface faces to the first end surface.

In some embodiments, the abutting portion further includes a pressing surface provided at an end of the second abutting surface, and a corner portion is formed between the pressing surface and the second abutting surface; when the connecting member moves from the second position to the first position, the first end of the connecting member abuts against the pressing surface, and slides to make the first abutting surface cooperate with the second abutting surface via the corner portion.

In some embodiments, the position limit assembly is capable of moving along the axial direction of the chuck.

In some embodiments, the position limit assembly includes a limiting member and an elastic member, the limiting member includes the abutting portion, and the elastic member is sandwiched between the limiting member and the chuck for resetting of the limiting member after movement.

In some embodiments, a plurality of first opening are defined in the first end surface of the chuck and spaced from each other, the plurality of first openings are one-to-one corresponding to and in communication with the plurality of clamping slots; the limiting member further include a pressing portion, and the pressing portion extends through the first opening and is exposed outside the chuck.

In some embodiments, the limiting member further includes a guide portion, the elastic member is a spring, and the spring is mounted around the guide portion.

In another aspect, the present invention further provides a softbox, which includes the above substrate, a plurality of support bars connected to the second ends of the plurality of connecting members of the substrate, respectively, and a soft cloth attached onto the plurality of support bars.

Compared with that prior art, the substrate of the softbox provide by the embodiment of the present invention has the connecting members and position limit assemblies which are movably connected to the chuck, respectively. The connecting member is capable of rotating relative to the chuck to the first position to make the first end of the connecting member abut against the abutting portion, thereby locking the connecting member. The position limit assembly is capable of being moved to release the abutment of the abutting portion against the first end, making the connecting member be capable of rotating relative to the chuck to a second position. When there is no external force applied to the position limit assembly and the connecting member at the second position is rotated, the connecting member is capable of pressing the abutting portion of the position limit assembly and returning back to the first position. The substrate of the softbox provide by the embodiment is simple in structure and convenient in operation, and the purpose of folding and unfolding the connecting member can be achieved only by rotating the connecting member and moving the position limit assembly, respectively.

DESCRIPTION OF THE EMBODIMENTS

For better understanding the present application, detailed description will be given for the embodiments provided by the present application with reference to the append drawings. It should be noted that when an element is said to be "connected" to another element, it may be directly connected to another element, or indirectly connected to another element through one or multiple intermediate elements. In the specification, the oriental or positional relationships indicated by the terms "longitudinal", "transverse", "horizontal," "top", "bottom", "inner", "outer", "axial", "central", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Figure 1:
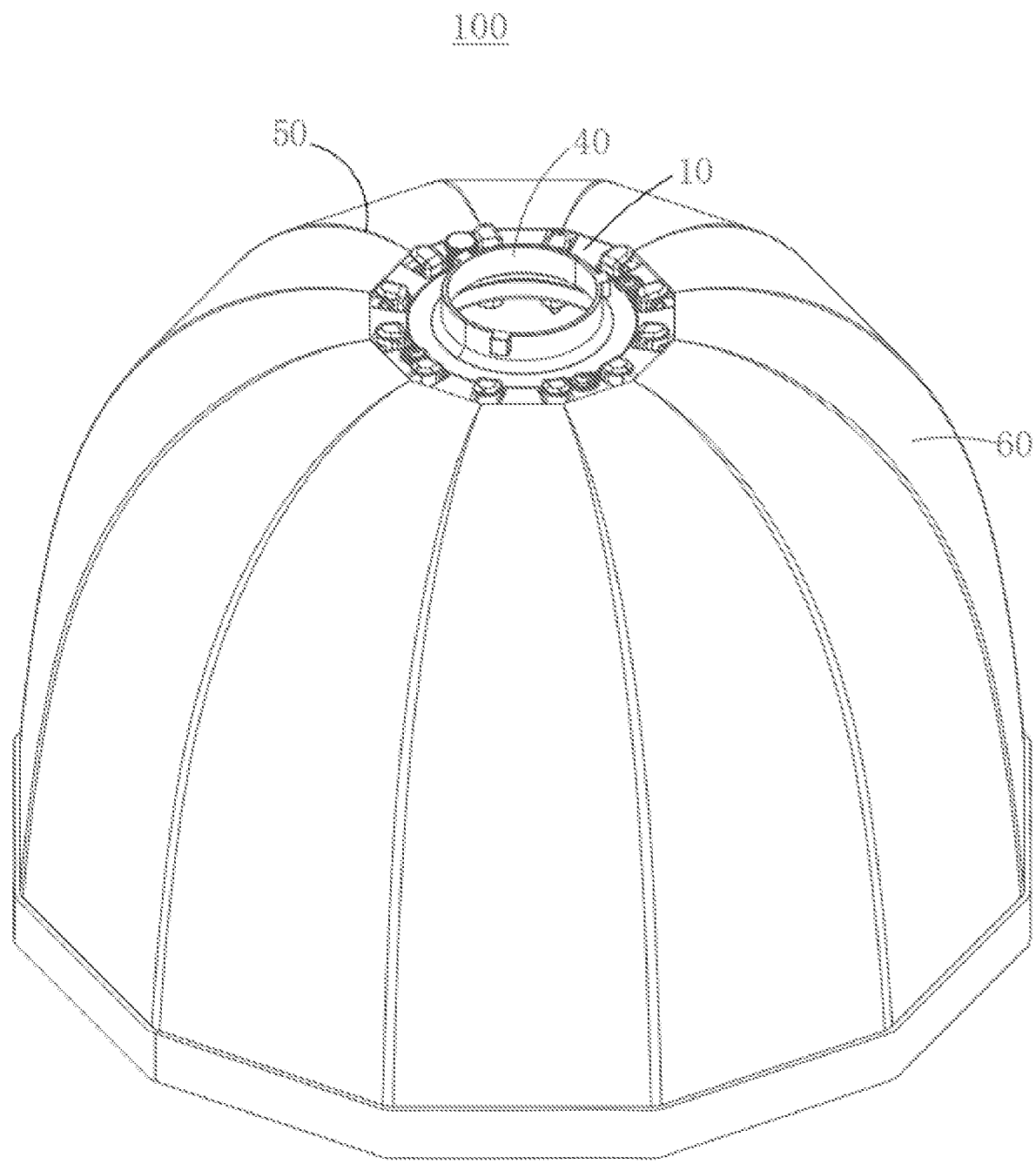
FIG. 1 is a schematic view of a softbox according to an embodiment of the present invention.
Figure 2:
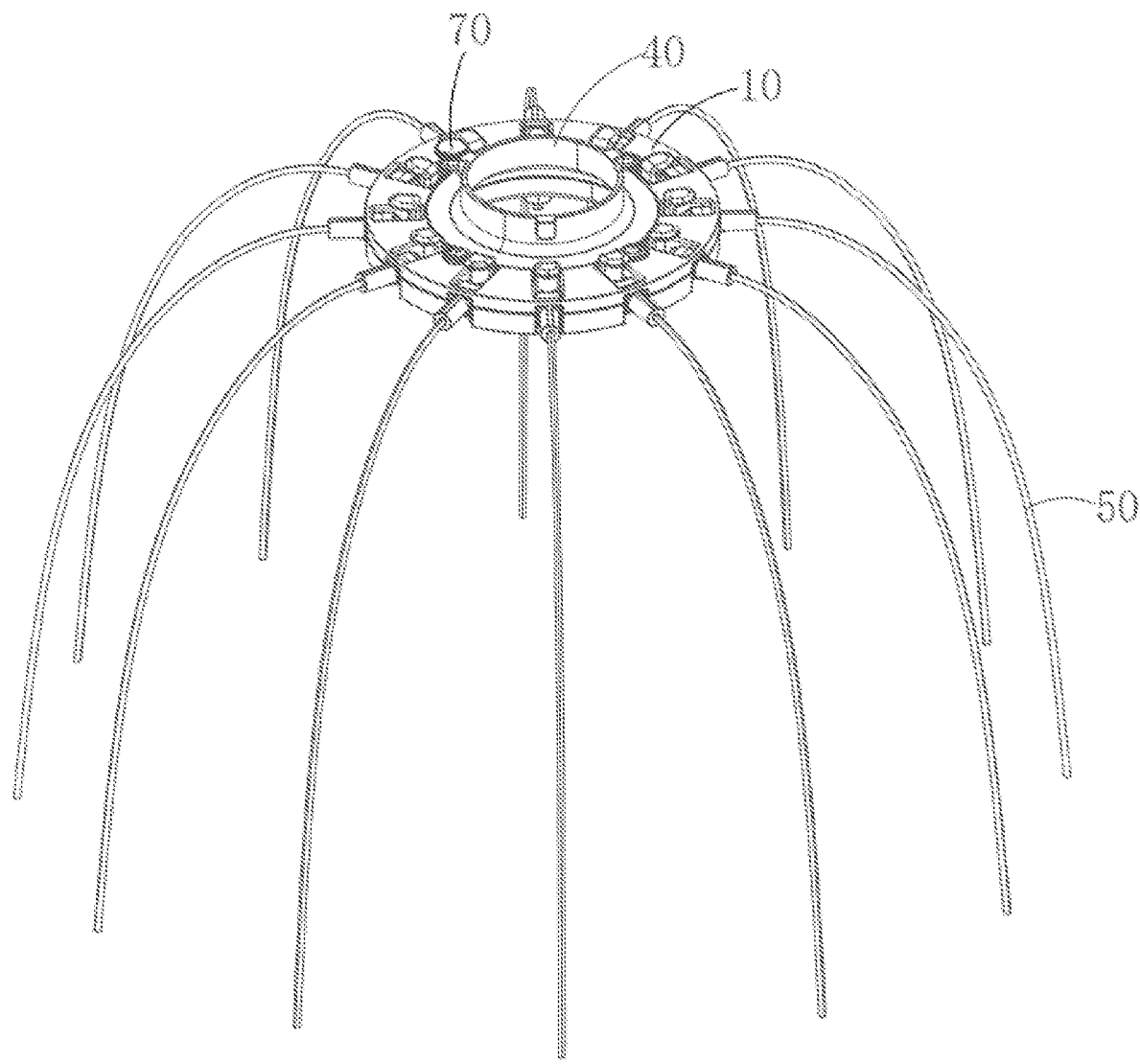
FIG. 2 is a schematic view of the softbox of FIG. 1 after removing a soft cloth thereof.

Referring to FIG. 1 and FIG. 2, a softbox according to an embodiment of the present invention includes a substrate 10, a snap ring 40, a plurality of support bars 50 connected to the substrate 10, and a soft cloth 60 attached onto the support bars 50.

The plurality of support bars 50 are configured to be foldable, so that the soft cloth 60 can be opened by the unfolded support bars 50 for use together with the strobe flash, and are easy to be stored after the support bars 50 being folded.

Specifically, the snap ring 40 is annular-shaped. One end of the snap ring 40 is rotatably mounted to a chuck 11 through an adjusting knob 70 to realize rotation adjustment, and the other end is configured to cooperate with a light source. A through hole is defined in a central portion of the snap ring 40 for light to pass through. By the arrangement of the snap ring 40, rotation of the softbox may be realized. There are a plurality of support bars 50, which are respectively connected to a plurality of connecting members 20. A logo may be provided on the soft cloth 60.

Please referring to FIGS. 3-5 and 13, the substrate 10 of the softbox includes the chuck 11, the plurality of connecting members 20 which are movably connected to the chuck 11, and a plurality of position limit assemblies 30 for limiting positions of the connecting members 20. The plurality of connecting members 20 are one-to-one corresponding and connected to the plurality of support bars 50, respectively. The connecting member 20 is rotatable relative to the chuck 11 to move to a first position or a second position. When the connecting member 20 is at the first position, an end of the connecting member 20 connected to the support bar 50 is relatively away from the center of the chuck 11 along the radial direction, so that the connecting member 20 and the support bar 50 are in the unfolded position. At this time, the connecting member 20 and the position limit assembly 30 abut against each other to lock the connecting member 20 at the first position. The position limit assembly 30 may be moved to release the connecting member 20, thereby enabling the connecting member 20 to rotate relative to the chuck 11 to the second position. When the connecting member 20 is at the second position, the end of the connecting member 20 connected to the support bar 50 is relatively close to the center of the chuck 11 along the radial direction, so that the connecting member 20 and the support bar 50 are folded. Without external force applied to the position limit assembly 30, the connecting member 20 is capable of pressing the position limit assembly 30 and returning back to the first position when the connecting member 20 at the second position is rotated.

Specifically, the chuck 11 in whole is generally disc-shaped and has a through hole defined in a central portion thereof. The chuck 11 includes an inner circumferential surface 111 and an outer circumferential surface 112 which are opposite in the radial direction, and a first end surface 113 and a second end surface 114 which are opposite in the axial direction. Hereinafter, the radial direction refers to the radial direction of the chuck 11, and the axial direction refers to the axial direction of the chuck 11. A plurality of clamping slots 115 are defined in a periphery of the chuck 11 and spaced from each other. The clamping slot 115 extends through the outer circumferential surface 112, the second end surface 114, and a joint portion between the outer circumferential surface 112 and second end surface 114 of the chuck 11, and finally terminates at a first edge 1121 of the outer circumferential surface 112 of the chuck 11. The first edge 1121 is spaced from the first end surface 113 with a certain distance along the axial direction. During the rotation of the connecting member 20 to the first position, the presence of the first edge 1121 does not cause interference. In this embodiment, the clamping slots 115 are the same with each other in shape, structure and dimension.

Figure 6:
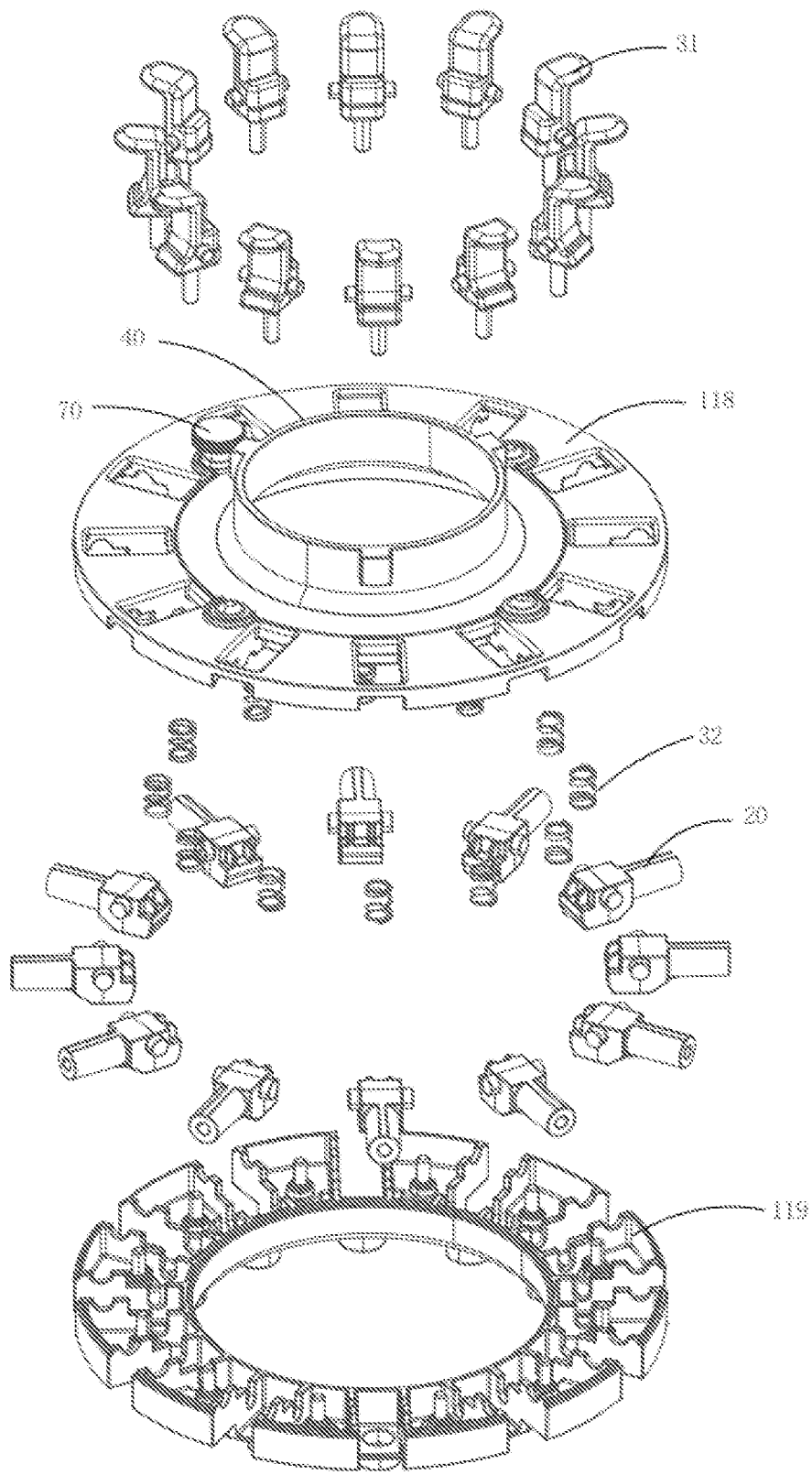
FIG. 6 is another exploded view of the substrate and snap ring of FIG. 3.

Please referring to FIG. 6, the chuck 11 is consisted of an upper housing 118 and a lower housing 119, and the lower housing 119 is detachably connected to the upper housing 118. Specifically, the detachable connection between the lower housing 119 and upper housing 118 is achieved by a plurality of screws. It should be noted that it is a conventional means for those skilled in the art to realize detachable connection by screws, which will not be described in detail.

Figure 3:
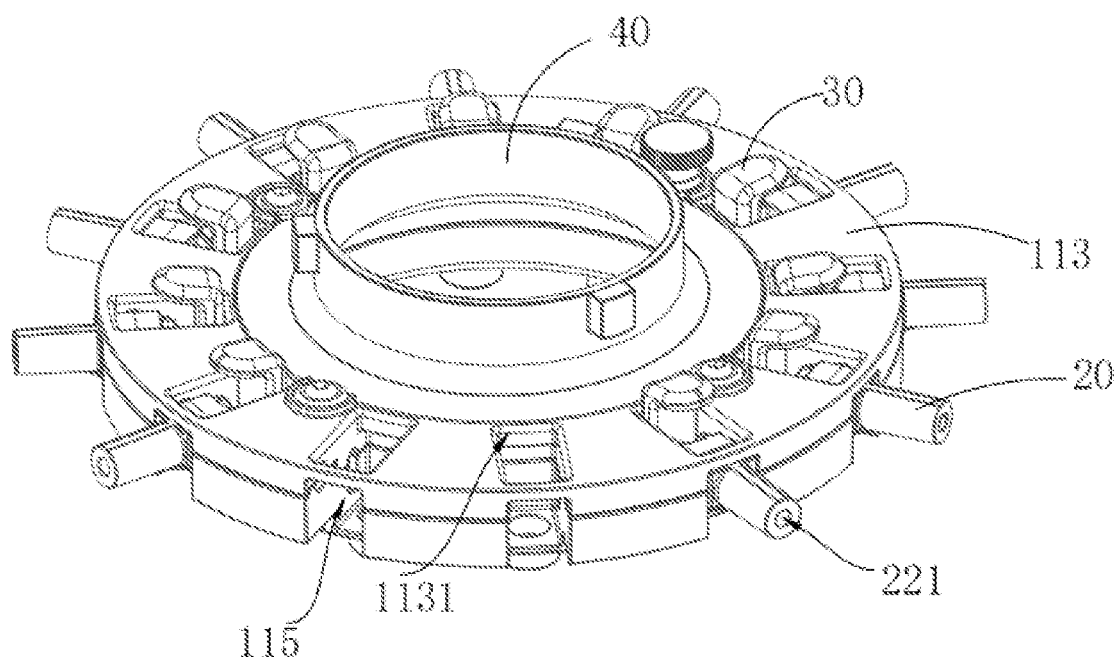
FIG. 3 is a schematic view of a substrate of the softbox and a snap ring of FIG. 2.
Figure 7:
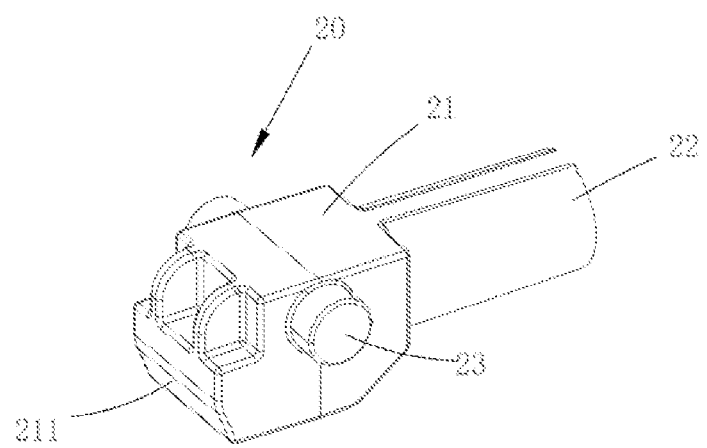
FIG. 7 is a schematic view of a connecting member of the substrate of the softbox of FIG. 6.

Referring to FIG. 7, the connecting member 20 is generally rod-shaped, and includes opposite first end 21 and second end 22. The first end 21 is rotatably connected to the chuck 11. As shown in FIG. 3, a passage 221 is defined in the second end 22 for mounting the support bar 50, thereby rotatably connecting the support bar 50 to the chuck 11.

Specifically, the first end 21 of each connecting member 20 is rotatably mounted in a corresponding clamping slot 115. The first end 21 is rotatably connected to a slot wall of the clamping slot 115. In this embodiment, the connecting member 20 is at the first position during operation (i.e., unfolded), and an extending direction of the connecting member 20 is parallel to the radial direction of the chuck 11, i.e., the connecting member 20 is oriented along the radial direction of the chuck 11. At this time, the first end 21 is located inside the clamping slot 115, and the second end 22 is capable of penetrating from the clamping slot 115 and being exposed outside the outer circumferential surface 112 of the chuck 11. Alternatively, the whole connecting member 20 may be located inside the clamping slot 115. Due to the presence of the first edge 1121, the connecting member 20 at the first position is pushed by the first edge 1121 and cannot be further rotated upwardly. Since the clamping slot 115 extends through the second end surface 114 of the chuck 11, the connecting member 20 at the first position can be rotated to the second position along a direction towards the second end surface 114 of the chuck 11. In this embodiment, the connecting member 20 at the second position has an extending direction parallel to the axial direction of the chuck 11, thus the connecting member 20 is rotatable relative to the chuck 11 between its radial direction and axial direction for the purpose of folding and unfolding. In other embodiments, the second position may also be other positions between the radial direction and axial direction of the chuck 11.

For saving space, the connecting member 20 at the first position is configured to be as close as possible to the first edge 1121. Preferably, the first edge 1121 is flush with the horizontal plane, and a portion of the first edge 1121 facing to the first end surface 113 of the chuck 11 is planar when the connecting member at the first position, as shown in FIG. 7.

Figure 9:
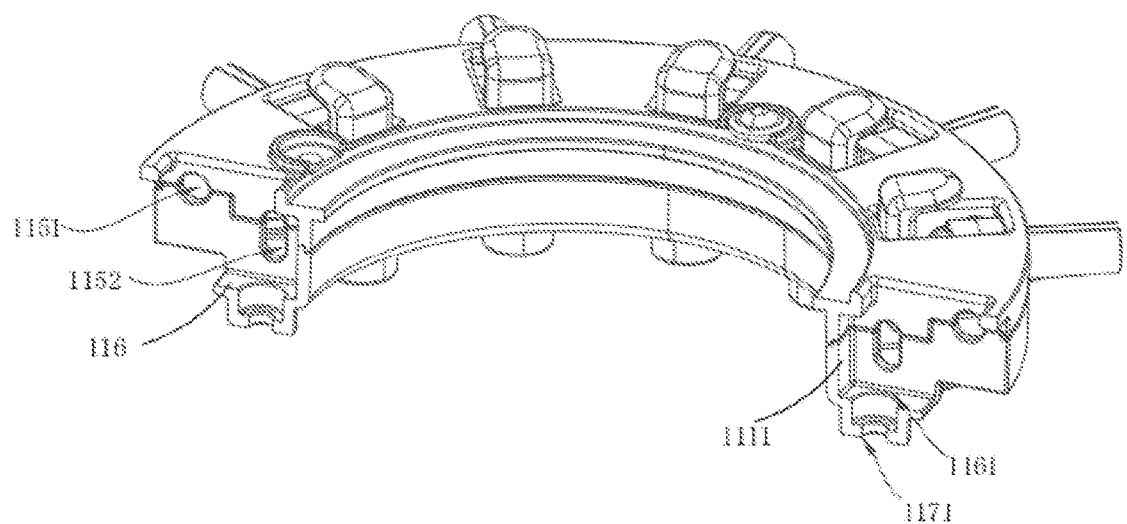
FIG. 9 is a schematic, cross sectional view of the substrate of FIG. 6.

As shown in FIG. 7 and FIG. 9, in this embodiment, in order to make the movement of the connecting member 20 relative to the chuck 11 more stable, each connecting member 20 further includes two pivot shafts 23 which are symmetrically fixed to both sides of the connecting member 20. Positioning grooves 1151 are defined in two opposite sidewalls of the clamping slot 115 along the radial direction of the chuck 11. The two pivot shafts 23 are rotatably engaged within the positioning grooves 1151 to realize the rotation of the connecting member 20 relative to the chuck 11. In this embodiment, the pivot shaft 23 is arranged adjacent to the first end 21, and the positioning groove 1151 is closer to the outer circumferential surface 112 than the inner circumferential surface 111 of the chuck 11.

The plurality of position limit assemblies 30 are respectively disposed at the plurality of clamping slots 115, corresponding to the plurality of connecting members 20. When the connecting member 20 is at the first position, the position limit assembly 30 limits a position of the connecting member 20 and prevents the connecting member 20 from rotating relative to the chuck 11, thereby the connecting member 20 being positioned at the first position. In this situation, a position of the position limit assembly 30 is defined as the first position. It should be noted that the position limit assembly 30 and the connecting member 20 may be limited by clamping, abutting, magnetic attraction and etc. The resetting of the position limit assembly 30 may be realized by an elastic member 32 or the like or by an external force.

In this embodiment, the position limit assembly 30 is configured to be movable relative to the chuck 11 when an external force is applied, thereby releasing the limit to the connecting member 20. The position limit assembly 30 may move along the axial direction of the chuck 11, the radial direction of the chuck 11, or other directions. For example, the position limit assembly 30 may move along the axial direction of the chuck 11 by a force in the axial direction of the chuck 11, or move along the radial direction of the chuck 11 by a force in the radial direction of the chuck 11. In this embodiment, the position limit assembly 30 moves along the axial direction of the chuck 11. Preferably, in order to make the movement of the position limit assembly 30 relative to the chuck 11 more stable, a sliding groove 1152 is defined in a slot wall of each clamping slot 115 and extends along the axial direction of the chuck 11. The position limit assembly 30 is provided with a sliding portion 311 matching with the sliding groove 1152, and the sliding portion 311 is received in the sliding groove 1152 and is capable of sliding along the sliding groove 1152. Through the sliding fit of the sliding portion 311 and the sliding groove 1152, the position of the position limit assembly 30 is not easily shifted when sliding up and down, so that the sliding is more stable. In this embodiment, two opposite sidewalls of each clamping slot 115 along the radial direction of the chuck 11 are respectively provided with one sliding groove 1152, and correspondingly there are two sliding portions 311 which are symmetrically fixed to two ends of the position limit assembly 30. In addition, in this embodiment, the sliding groove 1152 is closer to the inner circumferential surface 111 of the chuck 11 than the outer circumferential surface 112 of the chuck 11. The sliding portion 311 is generally column-shaped. As shown in FIG. 9, the sliding groove 1152 and the positioning groove 1151 are formed in the sidewall of the clamping slot 115 and spaced from each other along the radial direction of the chuck 11. A radial distance between the sliding groove 1152 and positioning groove 1151 is configured to make the connecting member 20 at the first position abut against the position limit assembly 30. Preferably, along the axial direction, the middle point of the positioning groove 1151 is higher than the middle point of the slide groove 1152.

In this embodiment, the position limit assembly 30 is configured to abut the connecting member 20 only when the connecting member 20 is at the first position, and does not interfere with the rotation of the connecting member 20 after being separated from the connecting member 20. For example, the first end 21 of the connecting member 20 is slightly enlarged in dimension, i.e., a dimension of a cross-section of the first end 21 is larger than that of other portions of the connecting member 20. Such configuration facilitates the first end 21 of the connecting member 20 to abut against the position limit assembly 30, and prevents other portions of the connecting member 20 from contacting the position limit assembly 30 during rotation thereof, so that the connecting member 20 rotates more stable.

Figure 10:
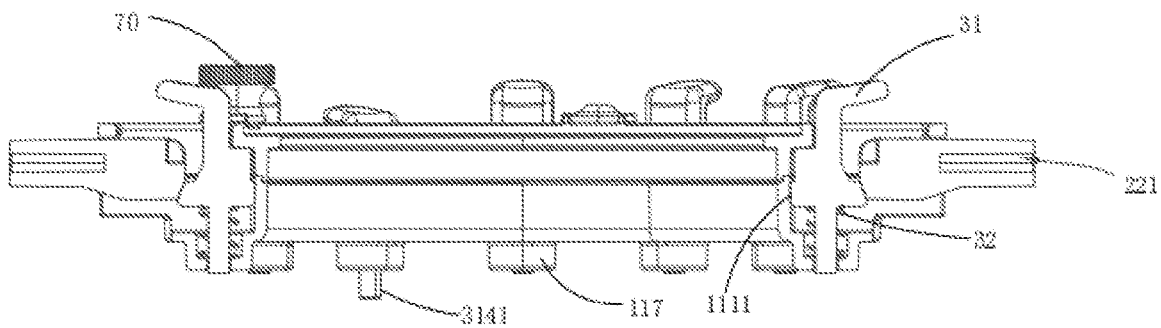
FIG. 10 is a cross sectional view of the substrate of FIG. 6, with the connecting member and position limit assembly at the first positon.

In this embodiment, as shown in FIG. 9 and FIG. 10, when the connecting member 20 is rotated to the first position, the position limit assembly 30 abuts against the chuck 11 and the connecting member 20 and thus is limited, thereby being unable to move along the radial direction. A portion of the connecting member 20 facing to the first end surface 113 abuts against the first edge 1121, and the first end 21 abuts against the position limit assembly 30. That is, portions of the connecting member 20 at two sides of the pivot shaft 23 are respectively abutted and limited by the first edge 1121 and the position limit assembly 30, which makes the connecting member 20 unable to move radially. Therefore, the connecting member 20 at the first position can be stably fixed in the radial direction with respect to the chuck 11.

Since the connecting member 20 at the first position is limited by the position limit assembly 30, the position limit of the position limit assembly 30 to the connecting member 20 can be released when the position limit assembly 30 is moved by applying a force thereon. The released connecting member 20 may rotate to the second position, making the connecting member 20 be folded. It should be noted that, after the position limit of the position limit assembly 30 to the connecting member 20 is released, the connecting member 20 may rotate relative to the chuck 11 under its own weight or under the assistance of an external force.

Figure 11:
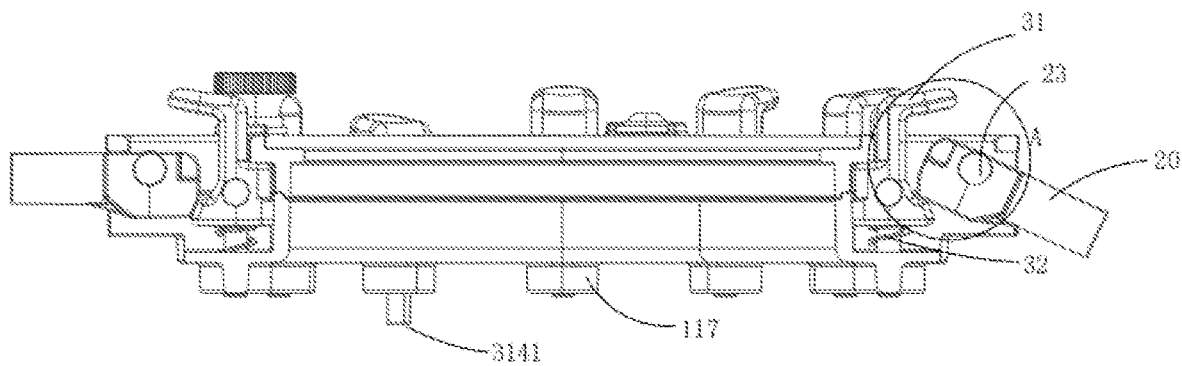
FIG. 11 is a cross sectional view of the substrate of FIG. 6, with the connecting member and position limit assembly at a position between the first positon and second position.
Figure 12:
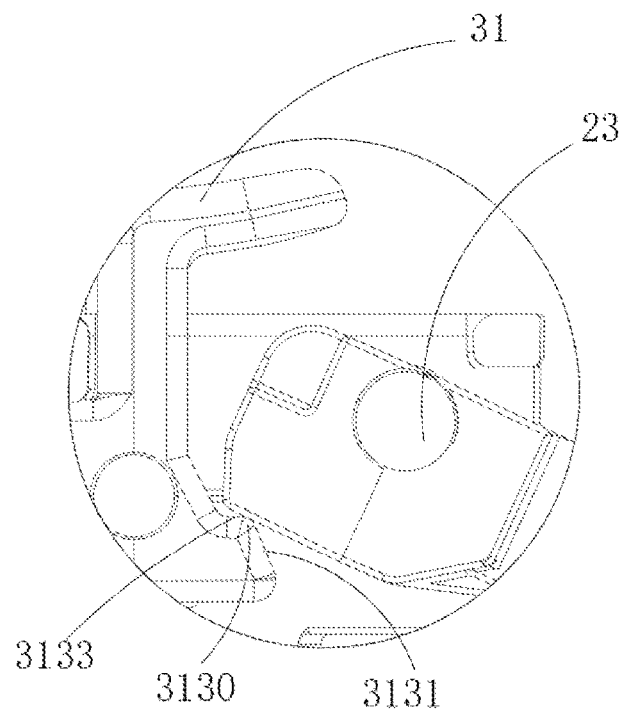
FIG. 12 is an enlarged view of a portion A of FIG. 11.
Figure 13:
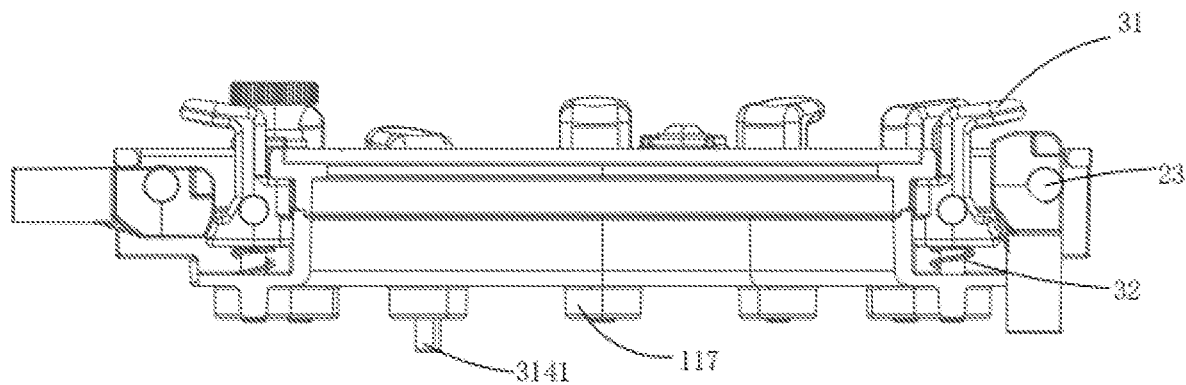
FIG. 13 is a cross sectional view of the substrate of FIG. 6, with the connecting member and position limit assembly at the second positon.

In this embodiment, after the position limit between the connecting member 20 and the position limit assembly 30 are released, the connecting member 20 may rotate to the first position and come into contact with the position limit assembly 30, thereby forming position limit again. The specific operation is as follows: when the connecting member 20 and the position limit assembly 30 at the first position, a force can be applied to the position limit assembly 30 to make it move, so as to release the position limit between the connecting member 20 and the position limit assembly 30. Then, the force applied to the position limit assembly 30 can be removed and the position limit assembly 30 can reset. After that, the connecting member 20 can rotate to the second position to be folded. When the connecting member 20 needs to be opened again, the connecting member 20 can be rotated from the second position. When the connecting member 20 rotate to a position adjacent to the first position, as shown in FIG. 11, the first end 21 of the connecting member 20 comes into contact with the reset position limit assembly 30. At this time, continue to rotate the rotating the connecting member 20, the first end 21 rotates downwardly around the pivot shaft 23 to press the position limit assembly 30 which is in contact with connecting member 20, thereby making the position limit assembly 30 move axially and downwardly until portions of the connecting member 20 at two sides of the pivot shaft 23 are abutted and limited by the first edge 1121 of the chuck 11 and the position limit assembly 30, respectively, and two radial sides of the position limit assembly 30 are abutted by the chuck 11 and the connecting member 20, respectively. At this time, the first end 21 of the connecting member 20 cannot further rotate downwardly and returns to the first position again, thereby realizing the unfolding of the connecting member 20. It should be understood that, in other embodiments, the position limit assembly 30 may be configured to move, for example, along the radial direction or other directions of the chuck 11, as long as at the first position, the position limit assembly 30 can be moved to release the position limit to the connecting member 20; and at the second position, the connecting member 20 can press the position limit assembly 30 to move back to the first position when the connecting member 20 is rotated.

Preferably, the connecting member 20 includes a first abutting surface 211, and the position limit assembly 30 includes a second abutting surface 3131 provided in the clamping slot 115. When the connecting member 20 and the position limit assembly 30 at the first position, the first abutting surface 211 and the second abutting surface 3131 are attached to and abut against each other. Specifically, the first abutting surface 211 is located at a bottom of the first end 21. Along a direction that the second end surface faces to the first end surface of the chuck, both the first abutting surface 211 and the second abutting surface 3131 are inclined towards the through hole of the chuck 11. Preferably, the inclination angles of the first abutting surface 211 and/or the second abutting surface 3131 are the same, preferably in the range of 30°-80°.

Figure 8:
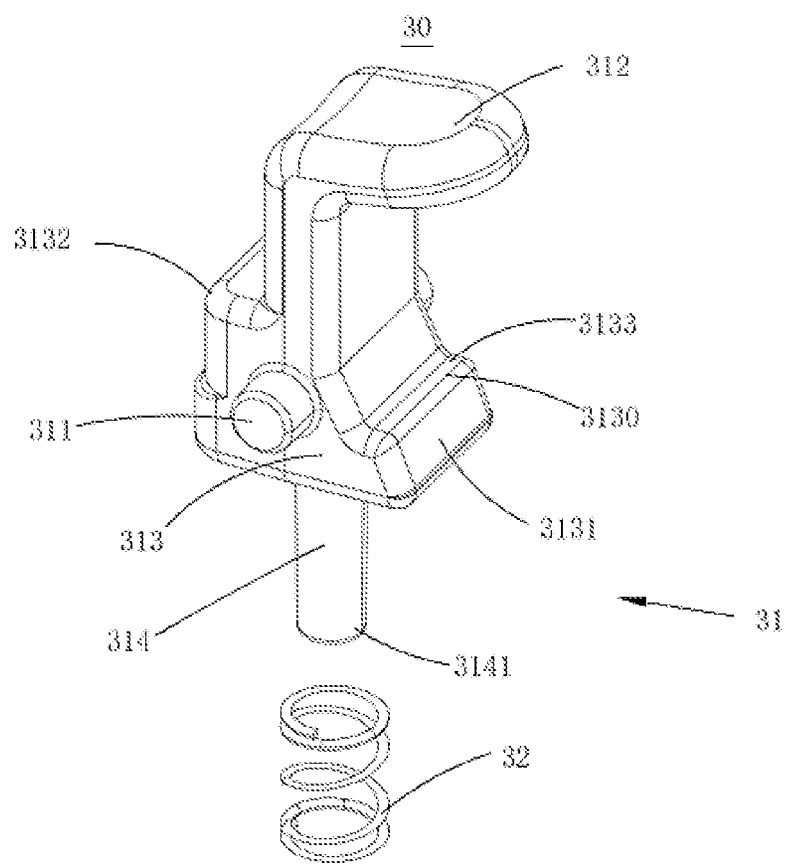
FIG. 8 is a schematic view of a position limit assembly of the substrate of the softbox of FIG. 6.

As shown in FIG. 7 and FIG. 10, the first abutting surface 211 extends obliquely and upwardly from a periphery of the bottom of the first end 21 towards the through hole of the chuck 11. At the first position, the second abutting surface 3131 and the first abutting surface 211 are oppositely and complementarily arranged. As shown in FIG. 8, an abutting portion 313 is further provided with a pressing surface 3133 which is located above the second abutting surface 3131. Preferably, the pressing surface 3133 extends substantially along the horizontal direction. A corner portion 3130 is formed between the pressing surface 3133 and the second abutting surface 3131. When the connecting member 20 is rotated to a position adjacent to the first position, firstly, the bottom of the first end 21 of the connecting member 20 comes into contact with the corner portion 3130 or the pressing surface 3133, as shown in FIG. 7, FIG. 8, FIG. 11 and FIG. 12. Since the position limit assembly 30 is movable along the axial direction, when the connecting member 20 continues to rotate, the bottom of the first end 21 slides to the second abutting surface 3131 via the corner portion 3130. At this time, a bottom of the first abutting surface 211 of the connecting member 20 is engaged with a top of the second abutting surface 3131 of the position limit assembly 30. When the connecting member 20 is further rotated, the first abutting surface 211 continues to slide along the second abutting surface 3131 until the first abutting surface 211 and the second abutting surface 3131 are completely attached to each other. That is, a top of the first abutting surface 211 faces the top of the second abutting surface 3131, and the bottom of the first abutting surface 211 faces a bottom of the second abutting surface 3131. At this time, the connecting member 20 rotates to the first position. In this embodiment, the angle of the corner portion is θ, wherein 90°≤θ<180°, preferably 90°<θ<120°. Preferably, the corner portion 3130 is of a streamlined design.

That is to say, the above process just needs to rotate the connecting member 20 and does not need to adjust the position limit assembly 30, and the rotating connecting member 20 enables the position limit assembly 30 to return to the first position, so as to realize abutment of the connecting member 20 and position limit assembly 30. It should be noted that surfaces of the connecting member 20 and the position limit assembly 30 abutting against each other include but are not limited to the above structure, and arc surfaces or other embodiments may be selected to realize abutment.

In this embodiment, referring to FIG. 8, the position limit assembly 30 includes a limiting member 31, and the limiting member 31 can respectively abut against the connecting member 20 and the chuck 11 to limit the connecting member 20 at the first position. Specifically, the limiting member 31 includes the abutting portion 313 which is received in the clamping slot 115 and configured for abutting against the connecting member 20. The second abutting surface 3131 is provided on the abutting portion 313, and is located at a side of the abutting portion 313 facing to the connecting member 20. A side of the abutting portion 313 away from the connecting member 20 abuts against the slot wall of the clamping slot 115. Specifically, the side of the abutting portion 313 away from the connecting member 20 has a convex portion 3132 extending radially and outwardly therefrom. Referring to FIG. 9, the chuck 11 includes a slot wall 1111 surrounding the clamping slot 115, and the slot wall 1111 is opposite to the inner circumferential surface 111. The convex portion 3132 abuts against the slot wall 1111 of the clamping slot 115 to prevent the position limit assembly 30 from moving radially when the clamping slot 115 moves. When the position limit assembly 30 and the connecting member 20 at the first position, the second end 22 of the connecting member 20 tends to move downwardly due to its own gravity and the gravity of the support bar 50 or a downward force, and thus the first end 21 of the connecting member 20 tends to move upwardly. The first abutting surface 211 generates an oblique upward pressing force on the second abutting surface 3131 of the position limit assembly 30, and the pressing force has a component in the radial direction, which makes the limiting member 31 have a tendency to move radially. At this time, the convex portion 3132 of the limiting member 31 abuts against the slot wall 1111 of the clamping slot 115, preventing the radial movement of the position limit assembly 30, so that the rotation of the connecting member 20 is also limited, thereby the connecting member 20 being restrained at the first position by the restraining assembly 30. Therefore, the connecting members 20 can be maintained at the first position, and the support bars 50 which are connected to the connecting members 20 can be maintained in the unfolded state.

In order to facilitate the operation of the limiting member 31, the limiting member 31 further includes a pressing portion 312. Preferably, the pressing portion 312 is formed at the top of the limiting member 31, and can be partially exposed outside the clamping slot 115, so as to be forced to operate it, making the limiting member 31 generate movement relative to the chuck 11 along the e axial direction.

Preferably, a plurality of first openings 1131 are defined in the first end surface 113 of the chuck 11 and spaced from each other. The first openings 1131 correspond to and communicate with the clamping slots 115, respectively. The pressing portion 312 extends through the first opening 1131 and is exposed outside the chuck 11. When the connecting member 20 at the second position, the first end 21 of the connecting member 20 may also be exposed outside the first opening 1131. It can be understood that the dimension of the first opening 1131 is designed to allow at least a portion of the position limit assembly 30 and the first end 21 of the connecting member 20 to be exposed. By providing the first opening 1131, the chuck 11 can accommodate a connecting member 20 with larger radial size, so that the rotation of the connecting member 20 is not limited by the first end surface 113 of the chuck 11, which can save the cost of the materials for manufacturing the chuck 11.

Specifically, as shown in FIG. 8, the pressing portion 312 is generally shaped as an inverted "L", and includes a lateral portion and a longitudinal portion connected to each other. The lateral portion is exposed outside the first opening 1131 to facilitate the pressing operation to the pressing portion 312. The longitudinal portion is connected to the abutting portion 313, and the dimension of the longitudinal portion of the pressing portion 312 in the axial direction of the chuck 11 is set as: when the connecting member 20 is rotated between the first position and the second position, the first end 21 is rotatable in a space between the pressing portion 312 and the abutting portion 313 without being interfered. Preferably, the dimension of the longitudinal portion of the pressing portion 312 in the radial direction of the chuck 11 is less than the dimension of the abutting portion 313 in the radial direction of the chuck 11, so as to facilitate the rotation of the connecting member 20.

In this embodiment, in order to facilitate the reset of the position limit assembly 30 after movement, the position limit assembly 30 further includes an elastic member 32 sandwiched between the limiting member 31 and the chuck 11. When the connecting member 20 at the first position needs to be folded, a force is applied to the limiting member 31 to make it leave the first position and compress the elastic member 32. At this time, the limiting member 31 is separated from the connecting member 20, and the connecting member 30 moves away from the first position. Thereafter, the force applied to the limiting member 31 is removed, and the elastic member 32 pushes the limiting member 31 to reset. Through the arrangement of the elastic member 32, the position limit assembly 30 can reset automatically, and the operation is convenient. Preferably, the elastic member 32 is a spring.

Figure 4:
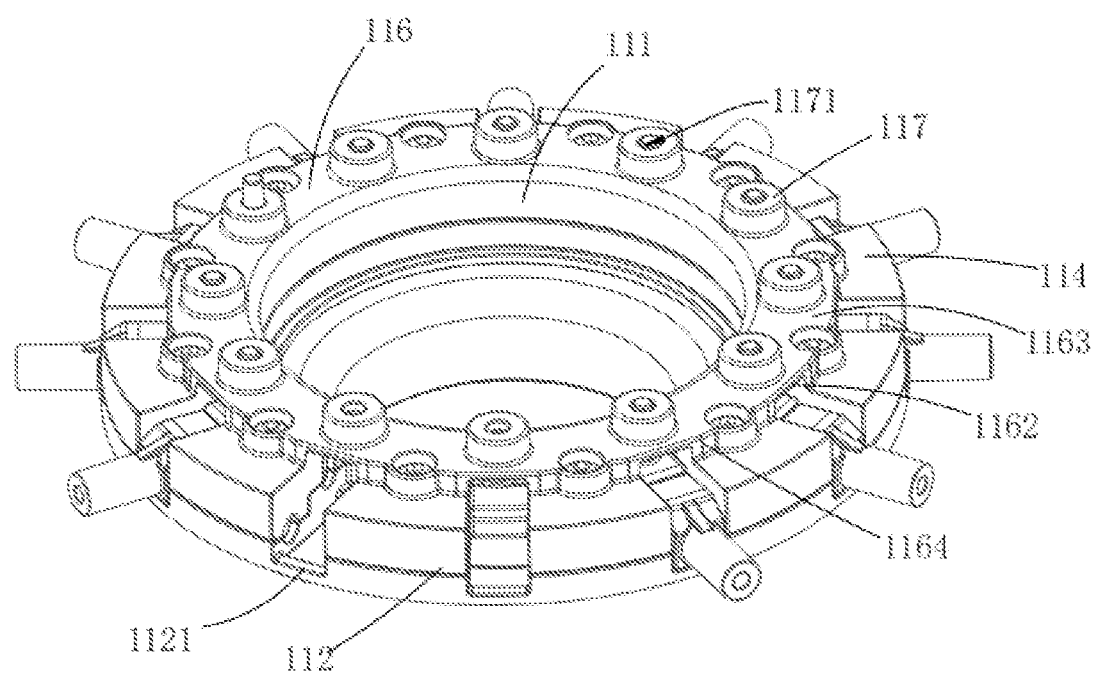
FIG. 4 is another view of the substrate and snap ring of FIG. 2.
Figure 5:
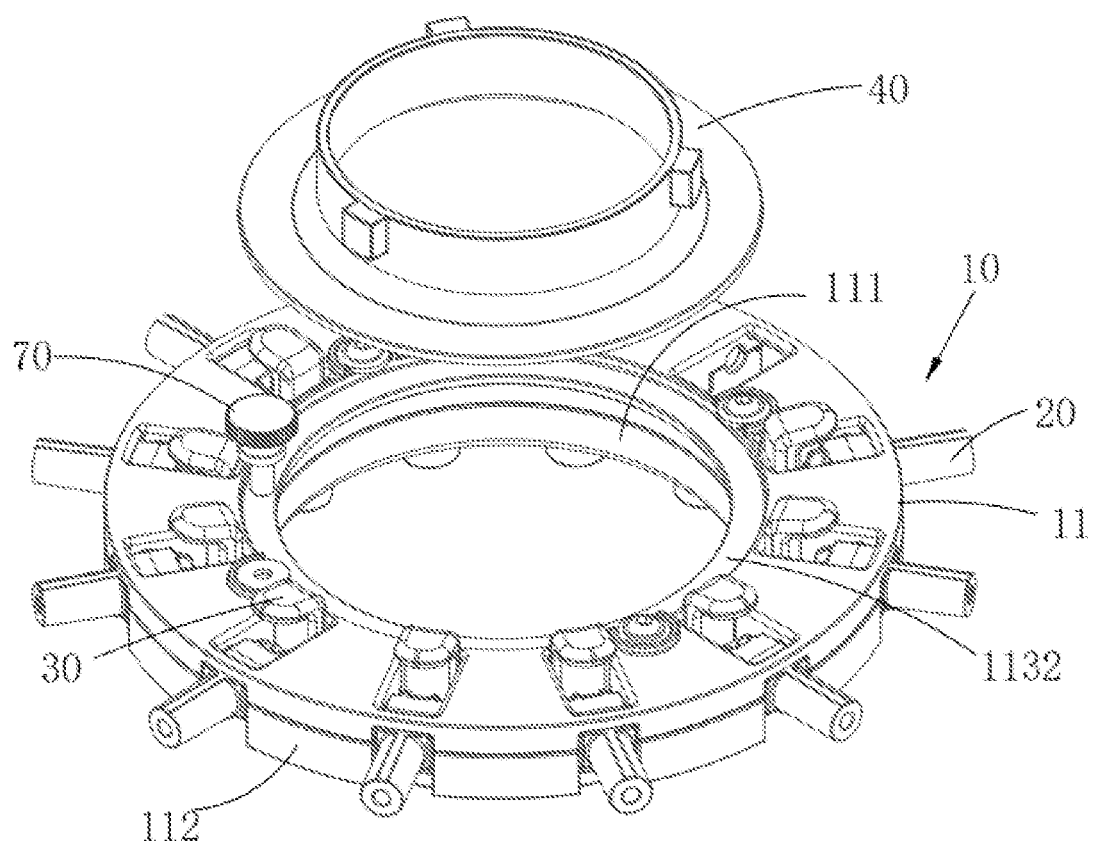
FIG. 5 is a schematic, exploded view of the substrate and snap ring of FIG. 3.

In this embodiment, in order to make the movement of the limiting member 31 relative to the chuck 11 more stable, the limiting member 31 may further include a guide portion 314 which is connected to the abutting portion 313. As shown in FIG. 8, the guide portion 314 is generally rod-shaped and includes a third end 3141 which extends axially from the second end surface of the chuck 11. In such a way, the position limit assembly 30 as a whole is generally shaped as "F". The spring is mounted around the outer periphery of the guide portion 314. The second end surface 114 of the chuck 11 is further provided with an annular convex ring 116, which is hollow inside and communicates with the plurality of clamping slots 115. As shown in FIG. 4 and FIG. 0.9, the convex ring 116 is adjacent to the inner circumferential surface 111 and protrudes out from the second end surface 114 of the chuck 11 along the axial direction. An axial internal wall of the convex ring 116 is configured for abutting against the abutting portion 313, thereby limiting the axial movement of the abutting portion 313. The convex ring 116 defines a plurality of second openings 1161 corresponding to the plurality of clamping slots 115, respectively. When a force is applied to the pressing portion 312 to make the abutting portion 313 abut against the axial internal wall of the convex ring 116, the third end 3141 of the guide portion 314 may be exposed outside the second opening 1161. Such structure enables the guide portion 314 and the spring to move in the same direction, so that the guide portion 314 moves more stably and is not easy to shake, and the movement of the guide portion 314 is not limited by the second end surface 114 of the chuck 11.

Preferably, a plurality of hollow guide seats 117 protrude axially from peripheries of the plurality of second openings 1161 of the convex ring 116. The guide seats 117 correspond to the second openings 1161, respectively. The guide seat 117 defines a third opening 1171 communicating with the second opening 1161. The spring is positioned in the guide seat 117 and mounted around the outer periphery of the guide portion 314. One end of the spring abuts against the abutting portion 313 and the other end abuts against the guide seat 117. Preferably, the guide portion 314, the spring, the second opening 1161 and the third opening 1171 all are coaxial. When a certain force is applied to the pressing portion 312 axially and downwardly to make the abutting portion 313 abut against the axial internal wall of the convex ring 116, the spring is compressed, and the third end 3141 of the guide portion 314 protrudes out from the third opening 1171. When the force applied to the pressing portion 312 is removed, the spring rebounds and pushes the abutting portion 313 to move upwardly along the axial direction until it is reset. The arrangement of the guide seat 117 makes the axial movement of the spring more stable, and in turn makes the movement of the abutting portion 313 on the chuck 11 more stable. Due to the arrangement of the second opening 1161 and third opening 1171, the movement of the guide portion 314 is not limited. It can be understood that, in other embodiments, the positioning member 31 may be configured without the guiding portion 314, and the spring may be sandwiched between the abutting portion 313 and the chuck 11 directly. In this case, it is not necessary to set the guiding seat 314 and the second opening 1161.

As shown in FIG. 4, the convex ring 116 further includes an axial end surface 1163 and a circumferential surface 1164 coaxial with the outer circumferential surface 112. The clamping slot 115 extends through the second end surface 114 of the chuck 11, the circumferential surface 1164 of the convex ring 116, and a joint portion between the second end surface 114 and circumferential surface 1164, and forms a second edge 1162 at the circumferential surface 1164 of the convex ring 116. The second edge 1162 is spaced from the axial end surface 1163 of the convex ring 1162 with a certain distance along the axial direction. When the connecting member 20 is rotated from the first position to the second position, the connecting member 20 is prevented from further rotating due to the presence of the second edge 1162. Thus, the connecting member 20 is restricted from rotating between the first position and the second position, i.e., its rotation angle is 90°.

The working process or working principle of this embodiment is as follows:

When the connecting member 20 and the position limit assembly 30 at the first position, the first abutting surface 211 of the connecting member 20 and the second abutting surface 3131 of the limiting member 31 abut against each other, two radial sides of the position limit assembly 30 respectively abut the connecting member 20 and the chuck 11, and portions of the connecting member 20 at two sides of the pivot shaft 23 respectively abut the first edge 1121 and the position limit assembly 30. Therefore, the connecting member 20 is limited in the radial direction, so that the connecting member 20 can be stably fixed onto the chuck 11, realizing unfolding of the connecting member 20.

When the connecting member 20 needs to be folded, firstly the pressing portion 312 of the limiting member 31 is pressed downwardly, the limiting member 31 moves to make the spring deform, and the abutting portion 313 is separated from the connecting member 20 immediately (in this situation, there is no necessary to provide a force, and the spring pushes the limiting member 31 to reset under the action of the rebound force). At this time, a force can be applied to the second end 22 of the connecting member 20 to make it rotate downwardly, and thus the connecting member 20 is able to rotate about the pivot shaft 23 to the second position, realizing folding of the connecting member 20.

When the connecting member 20 needs to be unfolded again, only the connecting member 20 at the second position needs to be forced to make its second end 22 rotate upwardly. When the connecting member 20 rotates to a position close to the first position, the bottom of the first end 21 of the connecting member 20 comes into contact with the corner portion 3130 or the pressing surface 3133 of the reset limiting member 31. At this time, rotating the connecting member 20 continuously enables the first abutting surface 211 and the second abutting surface 3131 to contact each other and slide relative to each other until they are completely fitted, that is, the connecting member 20 and the position limit assembly 30 return to the first position, and the connecting member 20 is unfolded again.

It should be noted that: the numbers of the clamping slots 115, the position limit assemblies 30 and the connecting members 20 are the same. It should be understood that other components such as the connecting members 20, the position limit assemblies 30, the first openings 1131 and the guide seats 117 are in a one-to-one correspondence with the clamping slots 115.

Finally, it should be noted that: the above merely describes preferred embodiments of the present invention without intention to limit the scope of the present invention. Although the present invention has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present invention should be within the scope of the present invention.

What is claimed is:

1. A substrate of a softbox, comprising:
    a chuck with a plurality of clamping slots defined along a circumferential direction thereof and spaced from each other;
    a plurality of connecting members corresponding to the plurality of clamping slots, respectively, each connecting member comprising opposite first and second ends, the first end being rotatably connected into a corresponding clamping slot and comprising a first abutting surface; and
    a plurality of position limit assemblies being movably mounted in the clamping slots along an axial direction of the chuck, respectively, each position limit assembly comprising an abutting portion and a convex portion being provided at opposite radial sides thereof, respectively, the convex portion abutting a slot wall of the corresponding clamping slot to prevent moving of the position limit assembly along a radial direction of the chuck, the abutting portion comprising a second abutting surface;
    wherein the connecting member is capable of rotating relative to the chuck to a first position to make the first abutting surface of the first end of the connecting member abut against the second abutting surface of the abutting portion, thereby locking the connecting member at the first position; and
    wherein the position limit assembly is capable of being moved axially to release the abutment of the abutting portion against the first end, making the connecting member be capable of rotating relative to the chuck to a second position; when there is no external force applied to the position limit assembly and the connecting member at the second position is rotated, the connecting member is capable of pressing the abutting portion of the position limit assembly and returning back to the first position.

2. The substrate according to claim 1, wherein the chuck is annular and comprises opposite first and second end surfaces along the axial direction thereof, the clamping slot extends through a periphery of the chuck, the second end surface, and a joint portion between the periphery and second end surface of the chuck, the second end of the connecting member protrudes out from the periphery of the chuck when the connecting member at the first position, and the second end of the connecting member protrudes out from the second end surface of the chuck when the connecting member at the second position.

3. The substrate according to claim 2, wherein the first abutting surface and second abutting surface both are inclined surfaces and incline toward the center of the chuck along a direction that the second end surface faces to the first end surface.

4. The substrate according to claim 2, wherein the abutting portion further includes a pressing surface provided at an end of the second abutting surface, and a corner portion is formed between the pressing surface and the second abutting surface; when the connecting member moves from the second position to the first position, the first end of the connecting member abuts against the pressing surface, and slides to make the first abutting surface cooperate with the second abutting surface via the corner portion.

5. The substrate according to claim 2, wherein the position limit assembly comprises a limiting member and an elastic member, the limiting member comprises the abutting portion and the convex portion, and the elastic member is sandwiched between the limiting member and the chuck for resetting of the limiting member after movement.

6. The substrate according to claim 5, wherein a plurality of first opening are defined in the first end surface of the chuck and spaced from each other, the plurality of first openings are one-to-one corresponding to and in communication with the plurality of clamping slots; the limiting member further comprise a pressing portion, and the pressing portion extends through the first opening and is exposed outside the chuck.

7. The substrate according to claim 5, wherein the limiting member further comprises a guide portion, the elastic member is a spring, and the spring is mounted around the guide portion.

8. The substrate according to claim 2, wherein a sliding groove is defined in a slot wall of each clamping slot and elongated along the axial direction of the chuck, the position limit assembly is slidably connected to a corresponding slot by a sliding portion.

9. The substrate according to claim 8, wherein the positioning groove is closer to the first end surface than the sliding groove, and the sliding groove is closer to an inner circumferential surface of the chuck than the positioning groove.

10. A softbox, comprising:
a substrate defined in claim 1;
a plurality of support bars connected to the second ends of the plurality of connecting members of the substrate, respectively, and
a soft cloth attached onto the plurality of support bars.

11. The softbox according to claim 10, wherein the chuck is annular and comprises opposite first and second end surfaces along the axial direction thereof, the clamping slot extends through a periphery of the chuck, the second end surface, and a joint portion between the periphery and second end surface of the chuck, the second end of the connecting member protrudes out from the periphery of the chuck when the connecting member at the first position, and the second end of the connecting member protrudes out from the second end surface of the chuck when the connecting member at the second position.

12. The softbox according to claim 11, wherein the first abutting surface and second abutting surface both are inclined surfaces and incline toward the center of the chuck along a direction that the second end surface faces to the first end surface.

13. The softbox according to claim 11, wherein the abutting portion further includes a pressing surface provided at an end of the second abutting surface, and a corner portion is formed between the pressing surface and the second abutting surface; when the connecting member moves from the second position to the first position, the first end of the connecting member abuts against the pressing surface, and slides to make the first abutting surface cooperate with the second abutting surface via the corner portion.

14. The softbox according to claim 11, wherein the position limit assembly comprises a limiting member and an elastic member, the limiting member comprises the abutting portion and the convex portion, and the elastic member is sandwiched between the limiting member and the chuck for resetting of the limiting member after movement.

15. The softbox according to claim 14, wherein a plurality of first opening are defined in the first end surface of the chuck and spaced from each other, the plurality of first openings are one-to-one corresponding to and in communication with the plurality of clamping slots; the limiting member further comprise a pressing portion, and the pressing portion extends through the first opening and is exposed outside the chuck.

16. The softbox according to claim 14, wherein the limiting member further comprises a guide portion, the elastic member is a spring, and the spring is mounted around the guide portion.

17. The softbox according to claim 11, wherein a sliding groove is defined in a slot wall of each clamping slot and elongated along the axial direction of the chuck, the position limit assembly is slidably connected to a corresponding slot by a sliding portion.

18. The softbox according to claim 17, wherein a middle point of the positioning groove is closer to the first end surface than a middle point of the sliding groove.

19. The softbox according to claim 17, wherein the sliding groove is closer to an inner circumferential surface of the chuck than the positioning groove.

20. The softbox according to claim 17, wherein the sliding groove is closer to an inner circumferential surface of the chuck than an outer circumferential surface of the chuck.

* * * * *